(12) United States Patent
Ingman

(10) Patent No.: US 7,420,827 B2
(45) Date of Patent: Sep. 2, 2008

(54) SELF OSCILLATING INRUSH CURRENT LIMITING CONVERTER

(75) Inventor: Thomas M. Ingman, Somis, CA (US)

(73) Assignee: Condor D.C. Power Supplies Inc., Ventura, CA (US)

(*) Notice: Subject to any disclaimer, the term of this patent is extended or adjusted under 35 U.S.C. 154(b) by 26 days.

(21) Appl. No.: 11/548,234

(22) Filed: Oct. 10, 2006

(65) Prior Publication Data

US 2008/0084718 A1 Apr. 10, 2008

(51) Int. Cl.
*H02M 7/155* (2006.01)
*G05F 1/613* (2006.01)

(52) U.S. Cl. ......................................... 363/86; 323/908

(58) Field of Classification Search ................. 323/222, 323/282, 284, 285, 901, 908; 363/18, 19, 363/49, 50, 56.1, 52, 81, 84, 85, 86, 89, 125, 363/126, 128
See application file for complete search history.

(56) References Cited

U.S. PATENT DOCUMENTS

| | | | |
|---|---|---|---|
| 3,935,527 A | 1/1976 | Michelet et al. | |
| 4,396,882 A | 8/1983 | Kellenbenz | |
| 5,202,819 A * | 4/1993 | Min | 361/436 |
| 5,283,707 A | 2/1994 | Conners et al. | |
| 5,374,887 A | 12/1994 | Drobnik | |
| 5,420,780 A * | 5/1995 | Bernstein et al. | 363/89 |
| 5,570,277 A * | 10/1996 | Ito et al. | 363/19 |
| 5,619,127 A * | 4/1997 | Warizaya | 323/275 |
| 5,835,365 A | 11/1998 | Lee | |
| 5,894,396 A | 4/1999 | Kim | |
| 5,930,130 A | 7/1999 | Katyl et al. | |
| 6,191,965 B1 | 2/2001 | Matsumoto | |
| 6,297,979 B1 * | 10/2001 | Tse | 363/86 |
| 6,335,654 B1 | 1/2002 | Cole | |
| 6,493,245 B1 | 12/2002 | Phadke | |
| 6,744,612 B2 | 6/2004 | Chen | |
| 6,856,526 B2 | 2/2005 | Elek et al. | |
| 7,019,583 B2 | 3/2006 | Del Signore, II et al. | |
| 7,304,456 B2 * | 12/2007 | Temesi et al. | 323/222 |

OTHER PUBLICATIONS

Ametherm Circuit Protection Thermistors, "What is inrush current? How is inrush current limited?," http://www.ametherm.com/Inrush_Current/inrush_current_faq.html, Dec. 16, 2004, Carson City, NV.
Ametherm Circuit Protection Thermistors, "Inrush Current," http://www.ametherm.com/Inrush_Current/surge_current_causes_and_prevention.htm, Dec. 16, 2004, Carson City, NV.
Brownlee, Ryan, "Inrush limiter also provides short-circuit protection," EDN (Electronic Design News), Jun. 9, 2005, pp. 87-88, 90, 92, 94.
Liu, Linus, "A New Approach to PFC Inrush Protection," Emerson Network Power, Summer 2003.

(Continued)

*Primary Examiner*—Gary L Laxton
(74) *Attorney, Agent, or Firm*—SoCal IP Law Group LLP; Mark A. Goldstein; John E. Gunther

(57) ABSTRACT

There is disclosed a power converter having limited inrush current and an inrush current limiter circuit. The inrush limiting circuit may be a self-oscillating switching-mode average current regulator tp provide a relatively constant average charging current to a bulk capacitor until the bulk capacitor is fully charged. A bypass switch may be used to route current around the inrush current limiter circuit once the bulk capacitor is fully charged.

17 Claims, 5 Drawing Sheets

OTHER PUBLICATIONS

Cole, Steven W. (Inventor), JPL Technology Reporting Office, Technical Support Package on Inrush-Current-Control Circuit, Nov. 1999, NASA Tech Brief vol. 23, No. 11 from JPL New Technology Report NPO-20403.

Ball, Alan, "NUD3048 Simple Inrush Current Limit Circuit." ON Semiconductor, Sep. 2004—Rev. 2, Semiconductor Components Industries, LLC, Phoenix, AZ.

* cited by examiner

Rectified Voltage

Voltage Across Bulk Capacitor 316

Average Charging Current

Time Slice 410

Power Switched On

Voltage at Node X

Current through Q1

Current through CR1

Current through W1 and B

Time Slice 410

SELF OSCILLATING INRUSH CURRENT LIMITING CONVERTER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to power supplies having high inrush currents incurred during initial AC turn on and during power cycling.

2. Description of the Related Art

The charging of a bulk capacitor during start-up of an off-line AC/DC power supply generates a surge current also known as an inrush current. The impact of inrush current can be mitigated in various ways. The techniques of reducing the impact of an inrush current are often referred to as inrush limiting and are performed by inrush limiters and inrush limiter circuits.

In low to medium power switching power supplies, inrush limiting may be accomplished by a negative temperature coefficient thermistor. In higher power switching power supplies, a variety of approaches have been utilized in an attempt to improve the efficiency of the main power circuit. In one approach, the current limiting element is bypassed after a bulk capacitor is charged. In one approach, a silicon controlled rectifier (SCR) lockout circuit is enabled so that main power flows around the inrush limiter rather than through it.

Some inrush limiting solutions have been accomplished with resistive elements that dissipate power. The watt-seconds dissipated in a resistive inrush limiter is equal to the watt-seconds stored in the bulk capacitor when it is charged to the peak voltage of the AC line. Using resistive inrush limiting is typically successful for a single turn on event when the resistor has a high surge rating. However, if the line keeps recycling, then the resistive inrush limiter suffers high dissipation and failures could occur.

DETAILED DESCRIPTION

Throughout this description, the embodiments and examples shown should be considered as exemplars, rather than limitations on the apparatus and methods disclosed or claimed.

Figure 1:
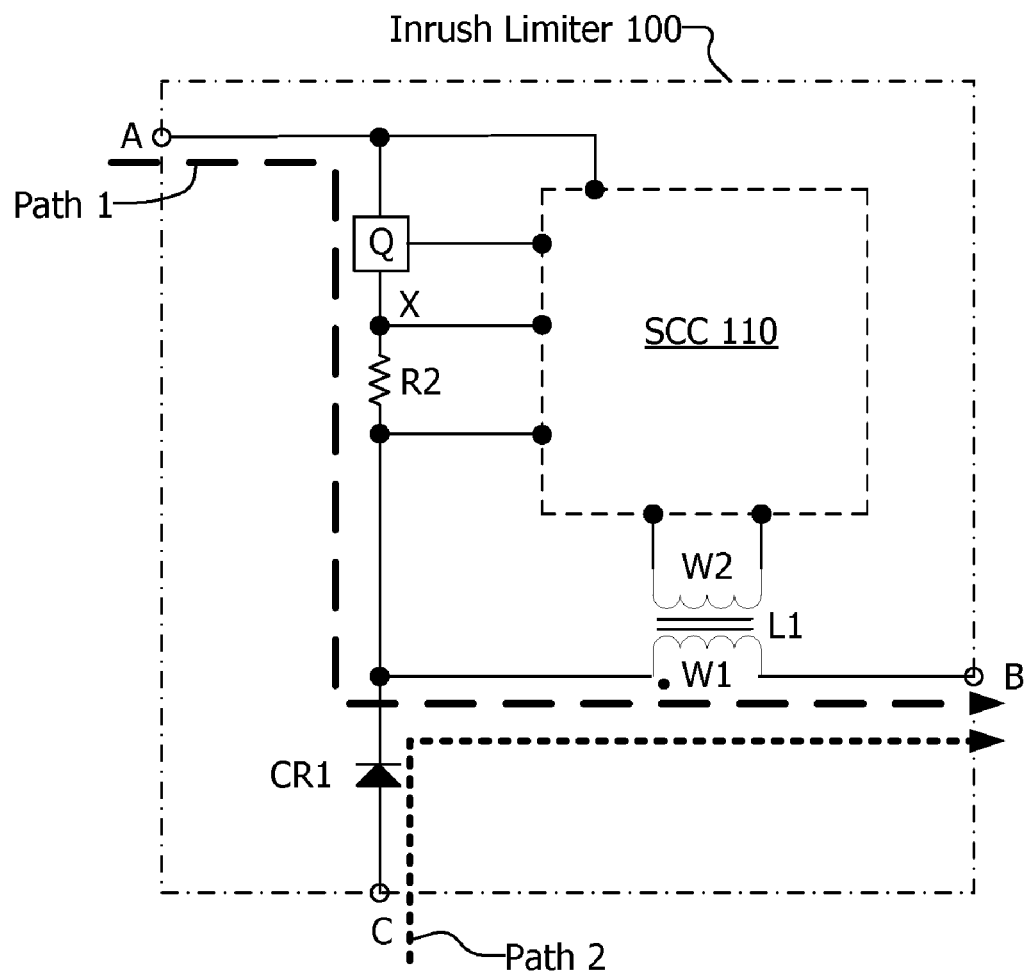
FIG. 1 is a diagram of an embodiment of a self oscillating inrush limiter circuit.

Referring to FIG. 1, the inrush limiter 100 includes a terminal A, a terminal B and a terminal C. Terminal A is an input normally connected to a power source, terminal B is an output normally connected to a load, and terminal C is a common connection for the return of the power source and load. Current passes through terminal A and exits at terminal B. The inrush limiter 100 includes a switch Q, a current sense resistor R2, windings W1 and W2 on either side of a power inductor L1, a rectifier CR1, and a sensing control circuit (SCC) 110. Switch Q may be a bipolar NPN transistor, FET switch, a MOSFET, and an insulated gate bipolar transistor (IGBT).

The switch Q, the primary winding W1 on power inductor L1, and the rectifier CR1 may be connected in a configuration similar to that commonly known as a buck regulator. When the switch Q is closed, or conducting, current flows from terminal A through the switch Q, the current sense resistor R2, and the winding W1 to terminal B via a path 1. This current flow both transfers power to the load and stores energy in the power inductor L1. When the switch Q is opened (set to a nonconducting state), the energy previously stored in the power inductor L1 is transferred to the load as a current flow along a path 2 through the rectifer CR1 and the winding W1. Thus current may flow to a load through terminal B whether the switch Q is open or closed.

The opening and closing of the switch Q is controlled by the SCC 110. The SCC 110 may sense the magnitude of the current flow along path 1 by measuring the voltage drop across the current sense resistor R2. The SCC 100 may also receive feedback of the voltage across the winding W1 in the form of a voltage across the secondary winding W2 on power inductor L1. The SCC 110 may use feedback from the winding W2 to cause the inrush current limiter 100 to self-oscillate and cause the switch Q to change repetitively between the on and off states.

Figure 2:
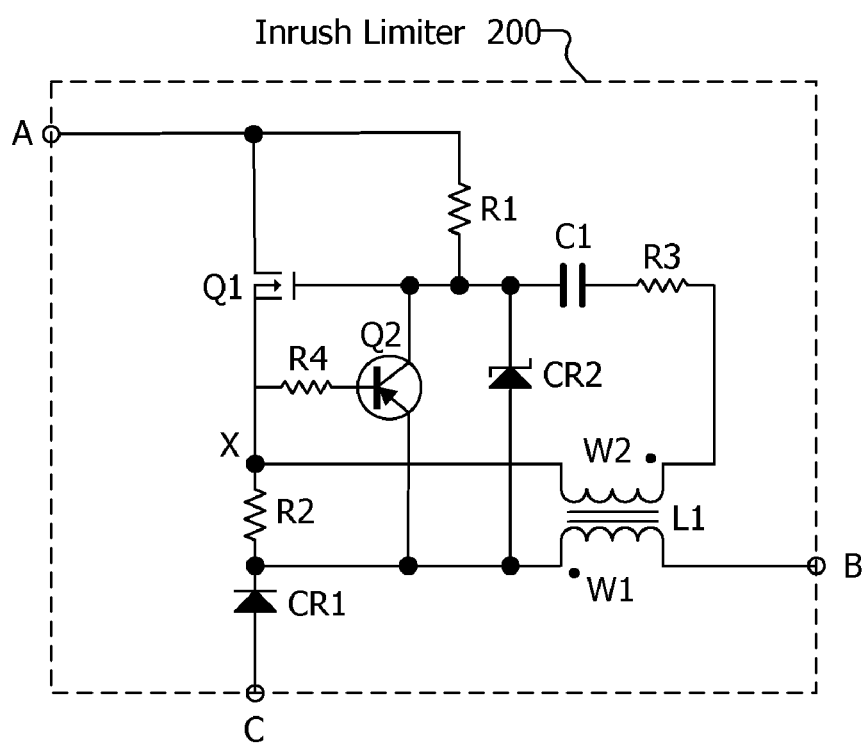
FIG. 2 is a diagram of a second embodiment of a self oscillating inrush limiter circuit.

Refer now to FIG. 2 which shows an inrush current limiter 200 including components of an exemplary version of SCC 110. When a voltage is initially applied to terminal A, a switch Q1 turns on by bleed current coming through a resistor R1. The Switch Q1 may be a bipolar NPN transistor, a FET switch, a MOSFET, and an insulated gate bipolar transistor (IGBT).

As the switch Q1 turns on, a voltage is imposed across a winding W1 of a power inductor L1. The power inductor L1 may have windings W1 and W2 that form a transformer. When a voltage is imposed across the winding W1 of the inductor L1, a voltage is produced across the winding W2 of the inductor L1. The winding W2 may be coupled to the switch Q1 through a resistor R3 and a capacitor C1. The voltage from the winding W2 may provide positive feedback to accelerate the turn-on of the switch Q1.

With the switch Q1 fully on, the current through the winding W1 of the power inductor L1 will increase at a linear rate governed by the voltage across the winding W1 and the inductance of the power inductor L1. Thus current begins to flow from terminal A to terminal B of the inrush limiter 100. The current flow from terminal A to terminal B passes through a current sense resistor R2. The voltage across the current sense resistor R2 is proportional to the current flow. The current sense resistor R2 is connected in parallel with the base-emitter junction of a transistor Q2 through a current limiting resistor R4. When the voltage across the current sense resistor R2 exceeds the threshold of the transistor Q2, transistor Q2 will turn on and thus turn the switch Q1 off. The value of current sense resistor R2 may be selected such that the transistor Q2 turns on when the magnitude of the current through the current sense resistor R2 has reached a predetermined maximum value. As the switch Q1 turns off, the voltage across the winding W1 will abruptly reverse polarity as the energy stored in the power inductor L1 causes current to continue to flow to terminal B along a path through a rectifier CR1 and the winding W1. The abrupt change in voltage across the winding W1 may provide positive feedback through the winding W2 to accelerate the turn-off of the switch Q1.

With the switch Q1 turned off, the current flow along the path through the rectifier CR1 and the winding W1 to terminal B will gradually decay to zero at a rate governed by the voltage difference between terminal B and terminal C and the inductance of the power inductor L1. When the current flow through the winding W1 falls to zero, the rectifier CR1 will become reverse-biased and the voltage across the winding W1 will fall to zero. Because of the positive feedback provided by the winding W2, the switch Q1 will then turn on, repeating the cycle.

The current flow delivered to a load connected to the terminal B may be in the form of a triangular waveform that cycles between zero current and a maximum value determined by the SCC 110. While the instantaneous current delivered through the terminal B may vary, the average current value may be regulated. Thus the inrush limiter 100/200 may be described as a switching-mode average current regulator. The function and operation of the inrush current limiter 100/200 is different from that of a conventional buck regulator, which is typically used to regulate the instantaneous value of an output voltage or current.

The oscillation of the inrush limiter 100/200 will continue so long as the voltage at terminal A sufficiently exceeds the voltage at terminal B. In this context, "sufficiently exceeds" means that the difference between the voltage at terminal A and the voltage at terminal B is sufficient to support the operation of the inrush limiter 100/200. When the voltage at terminal A does not sufficiently exceed the voltage at terminal B, the oscillation of the inrush limiter 100/200 will stop and no additional current is supplied through terminal B. Whenever the voltage at terminal B is equal to or greater than the voltage at terminal A, the inrush limiter 100/200 is back-biased and ceases to function.

Referring back to FIG. 1, the peak current switching point of the inrush limiter 100 is set by the SCC. In the exemplary circuit of FIG. 2, the peak current value is set by the selection of the current sense resistor R2 and the transistor Q2. The peak current switching point of the inrush limiter 100/200 remains relatively constant independent of the voltage difference between terminal A and terminal B, so long as this voltage different is sufficient to sustain oscillation of inrush limiter 100/200.

The rate of change of the current though the inductor L1 will vary depending on the voltages at terminals A, B, and C. The average charge current when the voltage at terminal A is sufficiently higher than the voltage at terminal B is relatively constant and approximately equal to one-half of the peak current. (See FIG. 4C and described below) The inrush limiter 100/200 is both more effective and more efficient than resistive charging.

Figure 3:
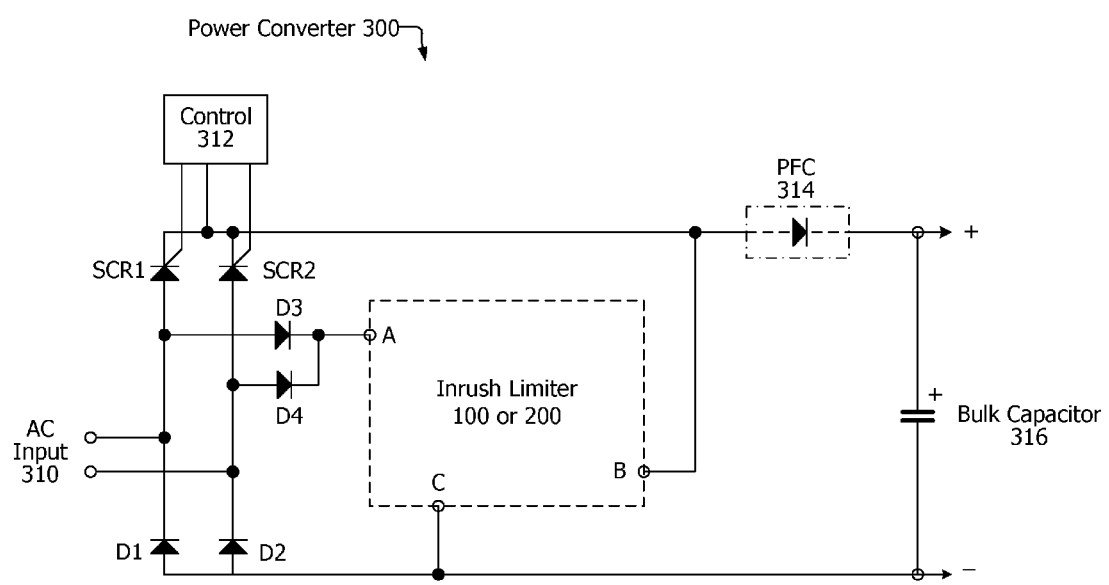
FIG. 3 is a diagram of a bulk capacitor charging circuit including the inrush limiter circuit of FIG. 1.

Referring now to FIG. 3, the inrush current limiter 100/200 is shown within a power converter 300. Diodes D1, D2, D3, and D4 form a full-wave bridge rectifier that converts an AC input 310 into a rectified voltage that is applied across terminal A and C of the inrush current limiter 100/200. A half-wave rectifier, a three-phase bridge rectifier, or a different form of rectifier circuit could be used to provide the rectified voltage. It should be understood that the rectified voltage is not a DC potential but rather a unipolar pulsating voltage. Whenever the voltage at terminal A sufficiently exceeds the voltage at terminal B (both with reference to common terminal C), the inrush limiter 100/200 oscillates as previously described in conjunction with FIG. 2. While the inrush current limiter 100/200 is oscillating, a relatively constant average current flows from terminal B to charge a bulk capacitor 316. During some portion of the AC input voltage cycle, the voltage at terminal A may be less than, or not sufficiently exceed, the voltage at terminal B and the inrush limiter 100/200 will not provide current to the bulk capacitor 316.

After some time, the cumulative charging current supplied to the bulk capacitor 316 will cause the bulk capacitor 316 to be fully charged. In this context, "fully charged" means that the voltage across the bulk capacitor 316 is high enough that the peak voltage applied to terminal A of the inrush limiter 100/200 cannot exceed the voltage at terminal B of the inrush limiter 100/200 by an amount sufficient to allow the inrush limiter 100/200 to oscillate. Once this condition is reached, the inrush limiter 100/200 will not provide further current to the bulk capacitor 316.

Because of the selection and arrangement of the components of the inrush limiter 100/200 described above, the inrush limiter 100/200 is generally non-dissipative. The inrush limiter 100/200 dissipates no or very little power. In one embodiment, the inrush limiter 100/200 completes its processing in 10 to 15 cycles of the AC input line 310. Further, the inrush limiter 100/200 can handle repeated on/off cycling without suffering excess heating of any of its components while still providing inrush protection to bulk capacitor 316 or other energy store coupled therewith. The inrush limiter 100/200 may be particularly useful with energy stores requiring 1,000 watts or more.

Referring to FIG. 3, a power factor correction (PFC) circuit 314 may optionally be coupled between the inrush limiter 100/200 and the bulk capacitor 316. The PFC circuit 314 may be or include a diode.

A silicon controller rectifier circuit comprised of a first silicon controller rectifier SCR1, a second silicon controlled rectifier SCR2, and control circuit 312 may be coupled between the AC source 310 and the line that delivers current to the bulk capacitor 316. The silicon control rectifier circuit may function as a bypass switch that causes current flowing from the AC source to bulk capacitor 316 to bypass the inrush limiter 100/200. The bypass switch is enabled by control circuit 312 when the bulk capacitor 316 is fully charged, locking out the inrush limiter 100/200 prior to heavy load current being drawn from bulk capacitor 316.

The functioning of the inrush limiters 100 and 200 can be more fully appreciated when viewing the graphs provided in FIGS. 4A, 4B, 4C, 5A, 5B, 5C and 5D.

Figure 4A:
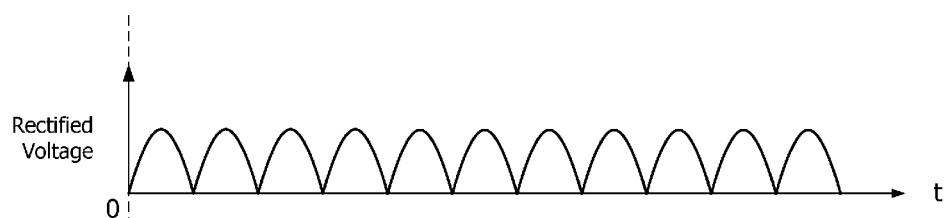
FIG. 4A is a is a graph of the waveform of the rectified voltage of AC line input 210 shown in FIG. 2.
Figure 4B:
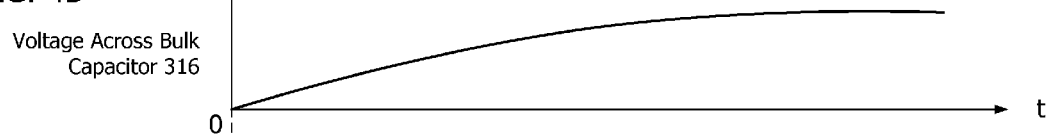
FIG. 4B is a is a graph of the waveform of the voltage of bulk capacitor 316 shown in FIG. 3.
Figure 4C:
FIG. 4C is a is a graph of the waveform of the average charge current of the inrush limiter circuit 200 shown in FIGS. 2 and 3.

FIG. 4A is a is a graph of the waveform of the rectified voltage of AC line input 310 applied to terminal A of inrush limiter 100/200 shown in FIG. 3. FIG. 4B is a is a graph of the waveform of the voltage across bulk capacitor 316 shown in FIG. 3. FIG. 4C is a is a graph of the waveform of the average charge current supplied to bulk capacitor 316 by inrush limiter 100/200 shown in FIG. 3 FIG. 4C shows that charging current is supplied to bulk capacitor 316 during portions of the AC input cycle when the rectified voltage (FIG. 4A) exceeds the voltage across the bulk capacitor (FIG. 4B). Thus the voltage across the bulk capacitor 316 ramps up (increases) at a relatively constant rate over time t (see FIG. 4B). Note that the average charge current provided by the inrush limiter 100/200 remains relatively constant, but the proportion of the AC cycle where the current is provided decreases as the voltage across the bulk capacitor increases. As shown in FIG. 4C the charging period of the inrush limiter 100 reduces over time as the voltage across the bulk capacitor (FIG. 4B) approaches the peak value of the rectified voltage (FIG. 4A).

Figure 5A:
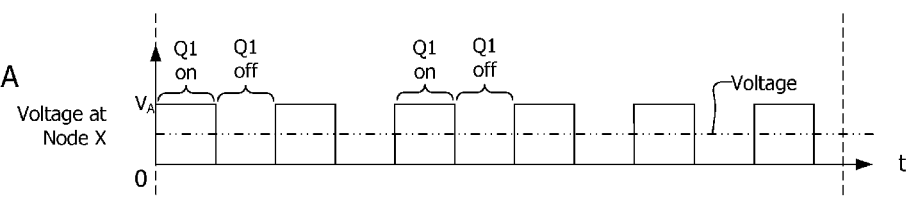
FIG. 5A is a graph showing a waveform of the voltage at terminal X of the inrush limiter shown in FIG. 1.

To appreciate the functioning of the inrush limiter circuits 100 and 200, graphs showing the current and voltage of some components of inrush limiter circuits 100 and 200 at time slice 410 of FIG. 4C are shown in FIGS. 5A, 5B, 5C and 5D. FIG. 5A is a graph showing a waveform of the voltage at terminal X relative to terminal C of the inrush limiters 100 and 200 shown in FIGS. 1 and 2. The voltage at terminal X of inrush limiter circuits 100 and 200 is near zero when Q/Q1 is off and reaches a maximum voltage nearly equal to the voltage at terminal A, $V_A$, when Q/Q1 is conducting. Because these graphs describe a narrow time slice 410, the voltage $V_A$ remains essentially constant.

Figure 5B:
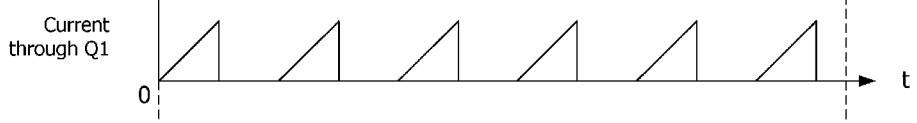
FIG. 5B is a graph showing a waveform of the current through switch Q1 of the inrush limiter shown in FIG. 1.
Figure 5C:
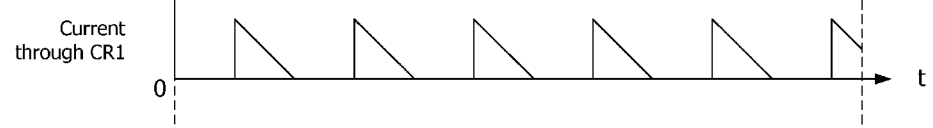
FIG. 5C is a graph showing a waveform of the current through rectifier CR1 of the inrush limiter shown in FIG. 1.
Figure 5D:
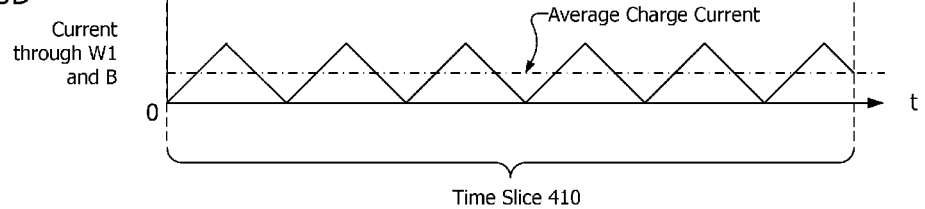
FIG. 5D is a graph showing a waveform of the current through terminal B of the inrush limiter shown in FIG. 1.

FIG. 5B is a graph showing a waveform of the current ramping up through the switch Q/FET switch Q1 of the inrush limiters 100 and 200 shown in FIGS. 1 and 2. FIG. 5C is a graph showing a waveform of the current ramping down through the rectifier CR1 of the inrush limiters 100 and 200 shown in FIGS. 1 and 2. FIG. 5D is a graph showing a waveform of the current flowing through terminal B and the winding W1 of the inrush limiters 100 and 200 shown in FIGS. 1 and 2. When the switch Q/Q1 turns on, current ramps up through the winding W1 of the inductor L1 and the switch Q/Q1 (see FIG. 5B). When the current through the switch Q/Q1 reaches a predetermined peak value, the SCC 110/Q2 switches the Q/Q1 off and the current in the winding W1 continues to flow via the rectifier CR1. (see FIG. 5C) The current in the rectifier CR1 ramps down (see FIG. 4C) until it goes to zero, at which time the collapsing voltage across the winding W1 starts the cycle over. The current through the winding W1 (and through terminal B) cycles up through the switch Q/Q1 and down through the rectifier CR1 as shown in FIG. 5D.

Closing Comments

The foregoing is merely illustrative and not limiting, having been presented by way of example only. Although examples have been shown and described, it will be apparent to those having ordinary skill in the art that changes, modifications, and/or alterations may be made.

As used herein, whether in the written description or the claims, the terms "comprising", "including", "carrying", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one element having a certain name from another element having a same name (but for use of the ordinal term) to distinguish the elements.

As used herein, "and/or" means that the listed items are alternatives, but the alternatives also include any combination of the listed items.

The invention claimed is:

1. A power converter with limited inrush current, comprising:
   a rectifier circuit for converting an AC input voltage to a rectified voltage
   a switching-mode average current regulator connected to receive the rectified voltage from the rectifier circuit, the switching-mode average current regulator comprising:
   a switch
   a power inductor
   a diode
   a bulk capacitor connected to receive a charging current from the switching-mode average current regulator
   a bypass switch to allow a current flow to bypass the switching-mode average current regulator when the bulk capacitor is fully charged
   wherein the charging current flows on a first path through the switch and the power inductor when the switch is turned on, and the charging current flows on a second path through the diode and the power inductor when the switch is turned off, and
   wherein the switching-mode average current regulator provides a regulated average charging current to the bulk capacitor during time intervals when the rectified voltage sufficiently exceeds the voltage across the bulk capacitor.

2. The power convener of claim 1, wherein the switching-mode average current regulator is self-oscillating.

3. The power converter of claim 1, wherein the switching-mode average current regulator further comprises a control circuit to turn the switch off when the charging current reaches a predetermined limit.

4. The power converter of claim 3, wherein the control circuit comprises:
   a sense resistor in series with the switch, wherein the voltage across the sense resistor is proportional to the charging current
   a transistor to turn the switch off when the voltage across the sense resistor reaches a predetermined value.

5. The power converter of claim 3, wherein turning the switch on and off is accelerated by positive feedback provided by a secondary winding on the power inductor.

6. The power converter of claim 1, wherein the switch is one of a FET, a MOSFET, a bipolar transistor, an NPN transistor and an insulated gate bipolar transistor (IGBT).

7. The power convert of claim 1, wherein the bypass switch is comprised of a silicon controlled rectifier circuit connected between the AC input voltage and the output of the switching-mode average current regulator.

8. An inrush limiter circuit to limit the inrush current between a power source having a voltage and a bulk capacitor, the inrush limiter circuit comprising:
   a switching-mode average current regulator connected to the power source, the switching-mode average current regulator comprising:
   a switch
   a power inductor
   a diode
   wherein a charging current to charge the bulk capacitor flows on a first path through the switch and the power inductor when the switch is turned on, and the charging current flows on a second path through the diode and the power inductor when the switch is turned off, and wherein the switching-mode average current regulator provides a regulated average charging current to the bulk capacitor during time intervals when the voltage of the power source sufficiently exceeds the output voltage across the bulk capacitor.

9. The inrush limiter circuit of claim 8, wherein the switching-mode average current regulator is self-oscillating.

10. The inrush limiter circuit of claim 8, further comprising a control circuit to turn the switch off when the charging current reaches a predetermined limit.

11. The inrush limiter circuit of claim 10, wherein the control circuit comprises:
   a sense resistor in series with the switch, wherein the voltage across the sense resistor is proportional to the charging current
   a transistor to turn the switch off when the voltage across the sense resistor reaches a predetermined value.

12. The inrush limiter circuit of claim 10, wherein turning the switch on and off is accelerated by feedback provided by a secondary winding on the power inductor.

13. The inrush limiter circuit of claim 8, wherein the switch is one of an FET, a MOSFET, a bipolar transistor, an NPN transistor and an insulated gate bipolar transistor (IGBT).

14. The inrush limiter circuit of claim 8 wherein a power factor correction (PFC) circuit is coupled between the switching-mode average current regulator and the bulk capacitor.

15. A method of limiting inrush current to a power converter operating from an AC input voltage, comprising:
   rectifying the AC input voltage to provide a rectified voltage
   providing a regulated average charging current to a bulk capacitor by means of a switching-mode average current regulator operative during time intervals when the rectified voltage sufficiently exceeds the voltage across the bulk capacitor
   activating a bypass switch to allow a current flow to bypass the switching-mode average current regulator when the bulk capacitor is fully charged
   wherein the switching-mode average current regulator comprises
      a switch
      a power inductor
      a diode
   wherein the charging current flows on a first path through the switch and the power inductor when the switch is turned on, and the charging current flows on a second path through the diode and the power inductor when the switch is turned off.

16. The method of limiting inrush current of claim 15, further comprising:
   sensing a voltage across a sense resistor in series with the switch, wherein the voltage across the sense resistor is proportional to the charging current
   turning the switch off when the voltage across the sense resistor reaches a predetermined value.

17. The method of limiting inrush current of claim 15, wherein turning the switch on and off is accelerated by feedback provided by a secondary winding on the power inductor.

\* \* \* \* \*

UNITED STATES PATENT AND TRADEMARK OFFICE
CERTIFICATE OF CORRECTION

PATENT NO. : 7,420,827 B2  Page 1 of 1
APPLICATION NO. : 11/548234
DATED : September 2, 2008
INVENTOR(S) : Ingman It is certified that error appears in the above-identified patent and that said Letters Patent is hereby corrected as shown below:

On Title Page Item [57]
Abstract line 4: replace "tp" with --to--.

Column 6, line 30 claim 2: replace "convener" with --converter--.

Column 6, line 49 claim 4: replace "convert" with --converter--.

Signed and Sealed this

Fourth Day of November, 2008

JON W. DUDAS
*Director of the United States Patent and Trademark Office*